United States Patent [19]

Woodard

[11] Patent Number: 4,976,503
[45] Date of Patent: * Dec. 11, 1990

[54] OPTICAL ELEMENT FOR A VEHICLE WINDSHIELD

[75] Inventor: Floyd E. Woodard, Olivette, Mo.

[73] Assignee: Monsanto Company, St. Louis, Mo.

[*] Notice: The portion of the term of this patent subsequent to Jul. 24, 2007 has been disclaimed.

[21] Appl. No.: 385,507

[22] Filed: Jul. 27, 1989

[51] Int. Cl.$^5$ .................................................. C02B 5/28
[52] U.S. Cl. ..................................... 350/1.7; 350/164; 350/166; 52/171; 219/203; 296/96.19
[58] Field of Search ................. 350/1.6, 1.7, 164, 166; 296/84.1, 96.19; 52/171; 219/203

[56] References Cited

U.S. PATENT DOCUMENTS

| | | | |
|---|---|---|---|
| 2,593,525 | 4/1952 | Beckham | 296/96.19 |
| 2,636,420 | 4/1953 | Ryan et al. | 296/96.19 |
| 2,676,114 | 4/1954 | Barkley . | |
| 3,078,693 | 2/1963 | Lytle | 350/1.7 |
| 3,236,290 | 2/1966 | Lueder . | |
| 3,516,720 | 6/1970 | Mauer . | |
| 4,017,661 | 4/1977 | Gillery . | |
| 4,368,945 | 1/1983 | Fujimori et al. . | |
| 4,668,270 | 5/1987 | Ramus | 219/203 |
| 4,771,167 | 9/1988 | Boulos et al. | 219/203 |
| 4,782,216 | 11/1988 | Woodard | 219/522 |
| 4,786,783 | 11/1988 | Woodard | 219/203 |
| 4,797,317 | 1/1989 | Oliver et al. . | |
| 4,799,745 | 1/1989 | Meyer et al. | 350/1.7 |
| 4,820,902 | 4/1989 | Gillery | 52/171 |

Primary Examiner—Rodney B. Bovernick
Assistant Examiner—J. P. Ryan
Attorney, Agent, or Firm—Michael J. Murphy; William J. Farrington

[57] ABSTRACT

An optical element for a motor vehicle windshield comprises, in combination, an interference filter having one or more light-reflecting metal layers and one or more reflection-suppressing layers for coacting with the one or more metal layers to minimize reflection and enhance transmission in the visible region, a gradient band continuation of the interference filter above the direct line of forward vision through a windshield when disposed in a motor vehicle for reflective rejection of infra-red solar energy, such band including a light-reflecting metal layer gradually increasing in thickness toward a lateral edge of the band, a transparent substrate supporting such filter and gradient band and plural bus bars substantially parallel to the lateral edge of the gradient band in electrical contact with the metal layers of the interference filter and the gradient band continuation.

12 Claims, 4 Drawing Sheets

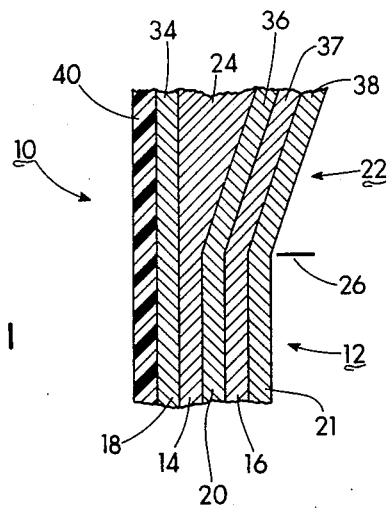
FIG. 1
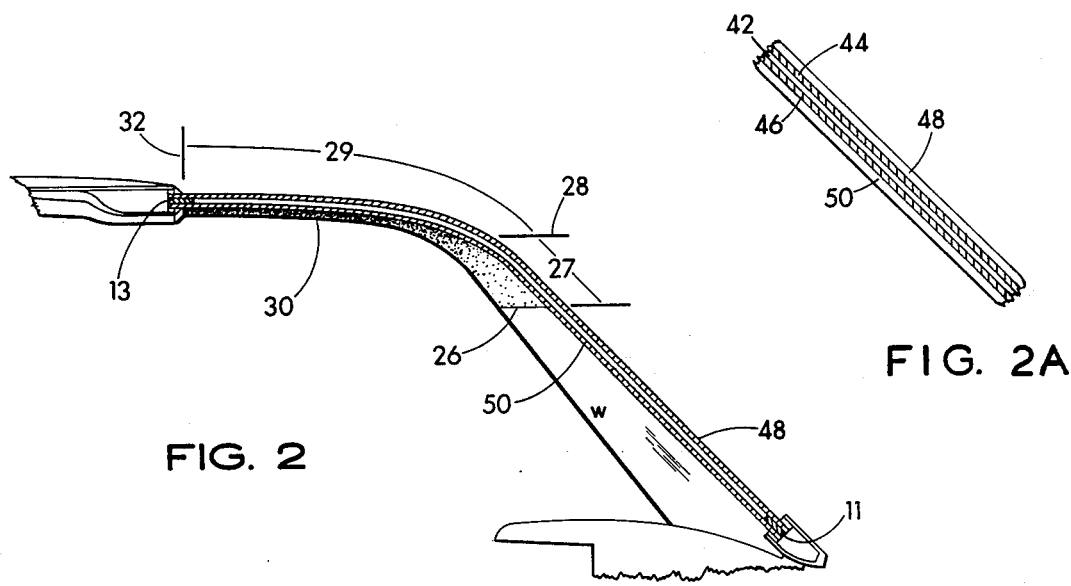
FIG. 2
FIG. 2A
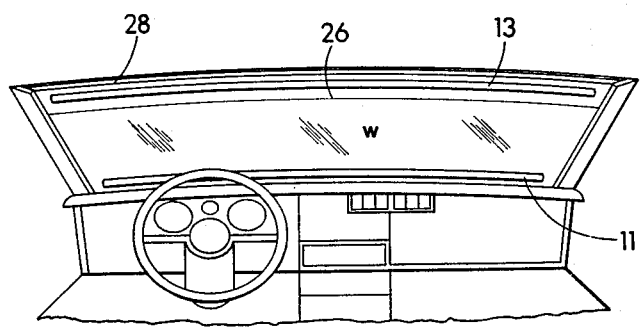
FIG. 3

OPTICAL ELEMENT FOR A VEHICLE WINDSHIELD

BACKGROUND OF THE INVENTION

This invention relates to reducing heat buildup and improving window defrosting/defogging performance in a motor vehicle and more particularly to doing so by the structure of the windshield.

Windshields of vehicles such as automobiles are conventionally of laminated glass comprising thermoplastic interlayer, such as a plasticized polyvinyl butyral or polyurethane sheeting, sandwiched between two sheets of glass. These assemblies are mounted in openings extending across the upper front ends of the vehicle bodies and, in modern designs, are inclined backwardly at a substantial angle from the vertical thereby admitting sunlight into large areas of the vehicle interior. The interlayer conventionally has an integral marginal band of a light-absorbing dye above the driver's direct line of vision through the windshield to reduce sunlight glare. This band is graduated in intensity, being greatest near the upper periphery of the interlayer when in place in a windshield and gradually diminishing to an almost imperceptible level at the lower edge of the band.

Solar screening films have been incorporated into these assemblies to reduce solar radiation influx while maintaining high luminous or visible light transmission, thus reducing temperature buildup within the vehicle from exposure to the sun's rays without adversely affecting visibility through the windshield. Such films are called interference or induced transmission filters and comprise a multi-layer coating of at least one layer of a reflective metal sandwiched between reflection-suppressing dielectric layers. Representative structures for motor vehicle windshields are disclosed in International Publication No. WO 88/01230 and U.S. Pat. No. 4,799,745.

For safety purposes windshields containing solar screening films must still comply with a federally-mandated 70% minimum luminous transmission level in the area of the driver's direct field of view, and for convenience should desirably still have the capability of minimizing glare. Moreover, there is a recent trend toward extending windshields back into the roof panel to provide a more open, spacious feeling to the occupants. The level of solar flux against an overhead windshield extension in the roof area, which is orthogonal to the sun's rays, is essentially maximum. However, absorptive solar rejection, by a dyed band or by heat absorbing glass has little or no effect on control of the internal equilibrium temperature of a vehicle parked in direct sunlight, because absorbed heat contributes substantially to increasing the interior vehicle temperature. Furthermore, though reducing luminous transmission in the visible region, a dyed gradient band provides no attenuation in the near infra-red region (700-3000 nm).

Furthermore, windshields having electrical defrosting or defogging capability are desirable and this is conveniently achieved through use of the metal layer in the interference filter as a conductor, as is disclosed in U.S. Pat. Nos. 4,782,216 and 4,786,783. While these systems are generally acceptable, electrical conductivity is constant throughout the windshield and, though also desirable, there is no capability of preferentially directing electric current flow to selected regions of the windshield through which the vehicle operator looks to maximize conductivity and wherefore minimize defrost/defog time.

SUMMARY OF THE INVENTION

Now improvements have been made in motor vehicle windshields with solar energy control features which alleviate prior art shortcomings.

Accordingly, a principal object of this invention is to provide an improved electrically conductive motor vehicle windshield.

An additional object is to provide an optical element for an electrically heated motor vehicle windshield which is capable of both solar screening and improved resistive heating for removing ice and condensation.

Another object is to provide such an optical element which is capable of directing electrical power primarily to the region of the windshield where it is functionally most useful—i.e. the region of high visible transmission required for safe driving.

Other objects of this invention will in part be obvious and will in part appear from the following description and claims.

These and other objects are accomplished by providing an optical element for a motor vehicle windshield comprising, in combination: (a) an interference filter which includes one or more light-reflecting metal layers and one or more reflection-suppressing layers for coacting with the one or more metal layers to minimize reflection and enhance transmission in the visible region; (b) a gradient band continuation of the interference filter above the direct line of vision through a windshield when the optical element is disposed therein, for reflective rejection of solar energy, such band including a light-reflecting metal layer gradually increasing in thickness toward a lateral edge of such band; (c) a transparent substrate supporting the filter and gradient band continuation; and (d) plural bus bars substantially parallel to the lateral edge in electrical contact with such one or more metal layers and the metal layer of the gradient band continuation.

By (i) positioning the bus bars of the optical element so as to extend laterally across the windshield and (ii) electrically associating them with the region of increased metal thickness of the gradient band continuation and a metal layer of lesser thickness in the interference filter segment, maximum electrical power (with consequent accelerated deicing or defogging) is directed to the interference filter segment which is in most need of deicing/defogging since aligned in front of the field of sight of vehicle occupant(s).

The thickness of the metal layer of the gradient band continuation preferably increases to about 200 to 1000 Angstroms (Å) from about 60 to 200 Å at the confluence with the interference filter segment. The gradient band continuation preferably includes extensions of the reflection-suppressing layers of substantially the same thickness as in the interference filter. When a windshield extension is intended, the metal layer continuation extends preferably into the roof line of the vehicle at a thickness greater than the minimum thickness of the metal layer extension, for example at essentially the same thickness as that of the maximum thickness of the wedge-shaped profile of the gradient band thickness.

BRIEF DESCRIPTION OF THE DRAWINGS

In describing the invention, reference will be made to the accompanying drawings wherein:

FIG. 1 is a partial, cross sectional view of a portion of an optical element according to the invention;

FIG. 2 is a central vertical sectional view of a vehicle windshield and windshield extension containing the optical element portion of FIG. 1. i.e. FIG. 2A is a partial, cross sectional view of a portion of the windshield of FIG. 2

FIG. 3 is a fragmentary elevational view of a windshield mounted in a motor vehicle containing an optical element of the invention;

DETAILED DESCRIPTION OF THE INVENTION

Figure 4:
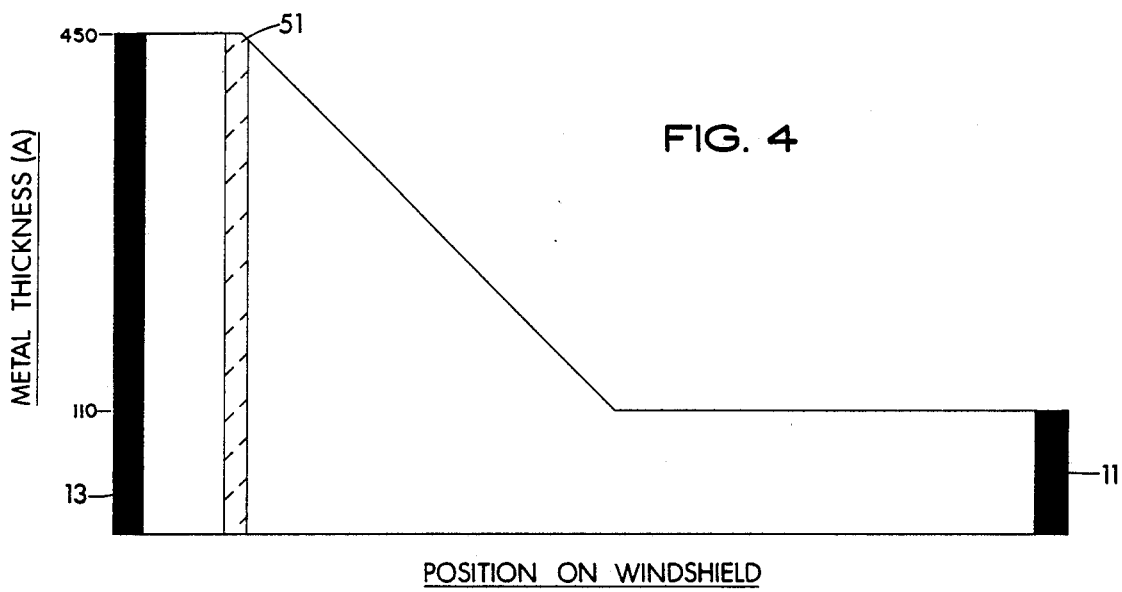
FIGS. 4 and 7 are schematic illustrations of metal thickness profiles of optical elements of the invention.

Referring now to the drawings, an optical element is depicted for motor vehicle windshield W which comprises solar screening section 10 of FIG. 1 in combination with bus bars or electrodes 11 and 13 (FIGS. 2,3).

Solar screening section 10 comprises a high-transmission interference filter segment 12 in the form of a multilayer coating which, in the embodiment shown, includes two light-reflecting silver metal layers 14, 16 of substantially uniform thickness separated by dielectric spacer layer 20, with two opposing planar surfaces of each of 14, 16 being in face-to-face contiguous engagement with reflection-suppressing dielectric layers 18, 21.

Optical element 10, 11, 13 further comprises gradient band continuation 22 of interference filter 12 above the direct line of forward vision through windshield W when the optical element is disposed therein in a motor vehicle, for reflective rejection of solar energy. Gradient band continuation 22 includes extension 24 which is preferably integral with light-reflecting metal layer 14 and which is wedge-shaped in thickness profile insofar as gradually upwardly increasing (though not necessarily linearly) toward a lateral peripheral edge of solar screening section 10. Extension 24 need not be integral with a metal layer of the high transmission interference filter segment 12, but alternatively could be deposited as a separate gradient layer, for example on the outboard surface of layer 38, which is futher identified below.

The direct line of forward vision through windshield W is the high visibility area subjacent imaginary line 26 in FIG. 2. The location of line 26 in windshields of U.S. vehicles is usually defined by the label "AS1" inprinted on one of the glass layers. Wedge-shaped integral gradient band continuation 22 is schematically highlighted in FIG. 2 by the gradual increase in multiple dot shading intensity from confluence 26 with interference filter segment 12 to lateral edge 28 (FIG. 3). Integral gradient band continuation 22 of solar screening section 10 when included in windshield W encompasses zone 27 between lines 26, 28, which is about the upper ⅓ of the windshield and is above the direct line of forward vision through windshield W.

When optional windshield extension 30 (FIG. 2) is present solar screening section 10 of the optical element preferably includes high reflection region 29 comprising a further continuation of metal layer 24 having a thickness greater than the minimum thickness, and exemplarily essentially equal to the maximum thickness of wedge-shaped extension 24 of gradient band 22. Extension 30 encompasses zone 29 within imaginary lines 28, 32.

Gradient band continuation 22 includes extensions 34, 36 and 38 of each of reflection-suppressing dielectric layers 18, 21 and spacer layer 20 of high-transmission interference filter 12, of substantially uniform thickness, which is substantially the same as the thickness of layers 18, 20, 21. Continuation 22 further includes unthickened metal layer extension 37 of metal layer 16 of high-transmission segment 12.

Optical element 10, 11, 13 further comprises a transparent substrate for solar screening section 10 which, in the illustrated embodiment, is thermoplastic sheet 40 (FIG. 1) of biaxially oriented polyethylene terephthalate. Before incorporation into windshield W, the structure of solar screening section 10 on transparent substrate 40, which is illustrated as 42 within the circle in FIG. 2A, is provided with metal bus bars 11,13 and then preferably sandwiched between and laminated to two layers of plasticized polyvinyl butyral 44 and 46 (FIG. 2). Bus bars 11,13 are introduced by laying them on top of the solar coating 12,22 before encapsulation between layers 44,46. In preparing windshield W, the encapsulate of sandwich components 42, 44 and 46 is then further laminated in conventional manner between outer float glass layers 48,50. Metal bus bars 11,13 are conventionally operatively associated by appropriate electrical leads (not shown) to a power source (not shown). When the power source is functioning, electrical current provided to the electrical leads causes heating of windshield W so defrosting and defogging occurs.

FIG. 4 schematically illustrates the metal layer thickness profile and bus bar location of a typical optical element embodiment of the invention. The thicknesses of silver layers 14, 16 in the high visibility region of windshield W below 26 containing interference filter 12 are 110Å and such layers 14,16 are electrically associated with bus bar 11. The thickness of metal layer 24 of gradient band 22 gradually increases from about 60 to 200 Å (e.g. 110 Å as shown) at the confluence (26 in FIG. 2) with the upper edge of interference filter 12 up to about 200 to 1000 Å (e.g. 450 Å as shown) at the lateral peripheral edge (28 in FIG. 2) of section 10 in the absence of a windshield extension. Alternatively, without extension 30, layer 24 may have a vertically short constant thickness portion at the upper end of the tapered section. With extension 30 present, high reflectance region 29 typically has essentially the same thickness (450 Å in FIG. 4) as that of the maximum thickness of the wedge-shaped thickness profile of gradient band 22. As schematically represented in FIG. 4, with extension 30 present, bus bar 13 (FIG. 2) parallel to the lateral peripheral edge of solar screening section 10 is in contact with the further metal layer continuations of section 22 whereas without a windshield extension (FIG. 3) such bus bar 13 is positioned as shown schematically at 51 in FIG. 4, i.e. at the lateral peripheral edge of gradient band continuation 22 and in touching electrical contact with the metal layers thereof.

Figure 7:
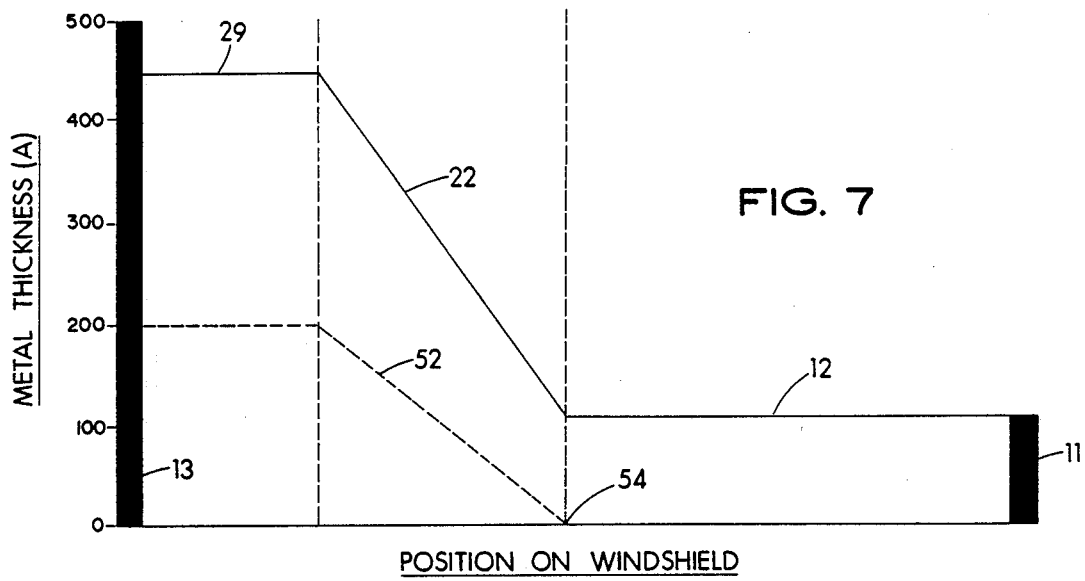

FIG. 7 schematically illustrates an antiglare feature for optional inclusion in the optical element. An antiglare backing is positioned behind the integral gradient band continuation for suppressing luminous reflection by absorption from within the vehicle when the optical element is disposed in windshield W. Such anti-glare backing comprises gradient metal layer 52 aligned behind gradient band continuation 22 commencing (zero thickness) at the confluence 54 of interference filter 12 and gradient band continuation 22, and complementing the thickness profile of gradient band continuation 22 insofar as gradually increasing to about 200 Å opposite the maximum thickness end of band 22 and then, if a windshield extension is present, continuing parallel to high reflectance region 29 at constant 200 Å thickness. The relative thickness of layer 52 need not be linear or proportional to that of section 22 and is chosen to balance glare suppression while retaining reasonable transmission.

Figure 10:
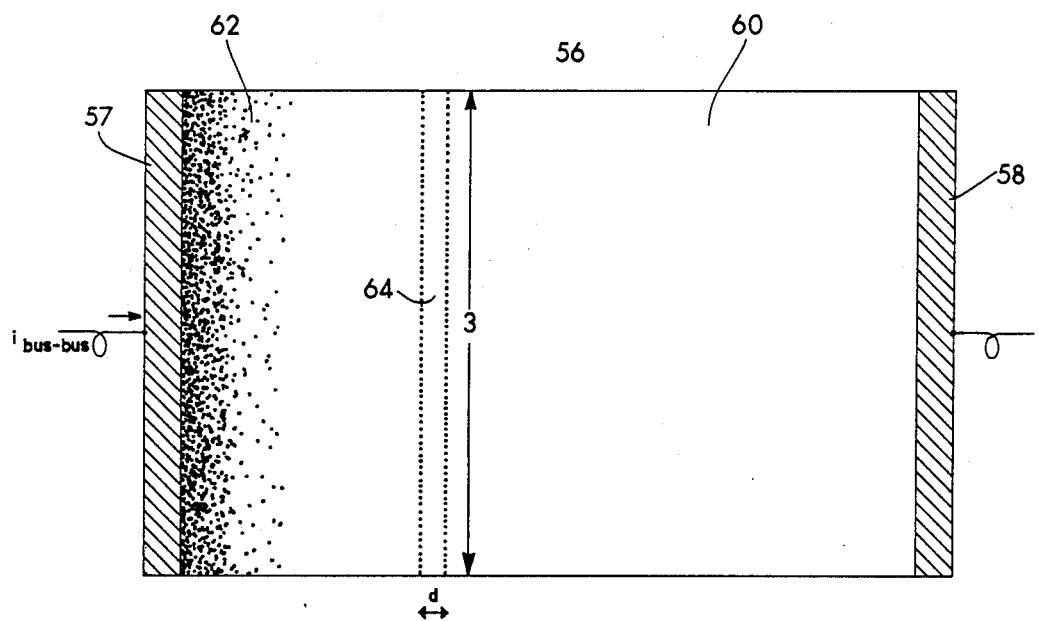
FIG. 10 is a diagram of an inventive optical element labeled with symbols facilitating explanation of power distribution therein.

The optical element of the invention by its construction importantly inherently directs most electrical power to the interference filter segment which, in windshield W, is the region in most need of defrosting, since required to be clear for driving. To illustrate this feature, refer to FIG. 10 where optical element 56 is shown comprising a piece of transparent glass substrate on which a three layer coating has been deposited which includes interference filter 60, integral gradient band continuation 62 and bus bars 57,58 on opposite ends of the substrate in electrical conductive contact with a middle silver metal layer, not shown, of filter 60 and continuation 62. When voltage is applied, for example from the electrical system of an automobile, between the two bus bars some current, labeled i(bus-bus), will flow. As described above, the conductive silver layer is thickest near bus bar 57 and gradually decreases to a constant thickness in region 60 which has a luminous transmission greater than 70%. To demonstrate the effect of graduated sheet resistivity on defrosting performance, consider segment 64 of length d and width w which is short enough that sheet resistivity across it is essentially constant since the thickness of the silver layer is nearly constant. Then resistance across segment 64 is given by:

$$R(segment) = R(sheet) \times d/w \qquad (1)$$

where R(sheet) is the sheet resistivity associated with a particular segment. The power developed across a given segment is:

$$Power = i(bus\text{-}bus)^2 \times R(segment) \qquad (2)$$

or substituting equation 1 into equation 2:

$$Power = i(bus\text{-}bus)^2 \times R(sheet) \times d/w \qquad (3)$$

From equation (3) most power will develop across segments with high sheet resistivity which corresponds to interference filter region 60 where the metal layer is thinnest and luminous transmission is maximum. Furthermore, locating a reflective gradient metal band in the vicinity of a bus bar, such as region 62 adjacent bus bar 57 in FIG. 10, reduces the likelihood of thermally induced failure at the bond between the gradient metal coating and bus bar, since electrical heating in the vicinity of the bus bar is minimal as just explained. Thus a preferred configuration of optical element includes an additional second narrow metal gradient band (not shown) near bus bar 58 which in use would be at the bottom of the windshield opposite region 62. Furthermore, such narrow band could reduce glare from the dashboard as well as the hood of the vehicle.

The interference filter component of the optical element of the invention is of the Fabry-Perot type designed, principally through the appropriate selection of materials and their thicknesses to maximize (i) transmission of visible or luminous (300-700 nm) and (ii) reflection of heat-generating infra-red (700-3000 nm) portions of the solar spectrum. Such filter consists of multiple, sequentially deposited successive, planar layers of angstroms-thick metal and dielectric coatings arranged in a predetermined sequence in face-adhering, contiguous contact with each other, of the type generally disclosed in U.S. Pat. Nos. 3,682,528, 4,179,181 and 4,799,754.

The interference filter component must contain at least one and preferably two or more light (near IR) reflecting metal layers which, when operatively positioned in a windshield in the direct line of forward vision of an occupant such as the driver, provide at least 70% visible light transmission of normal incidence measured as specified in ANSI Z26.1, which is the minimum allowed by the U.S. automotive industry. Preferably visible light reflectance, normal from the surface of the filter is less than 16%. The metal layers of the interference filter must be vertically separated in the thickness direction from each other by one or more dielectric layers conventionally used in interference filters which coact with the one or more metal layers so reflections of visible light from various interfaces interfere destructively thereby enhancing visible transmission.

The gradient band component reflectively rejects near infra-red solar energy and is an integral extension of a heat-reflective metal layer of the interference filter component of gradually increasing thickness toward an upper marginal edge of the optical element. Though more than one metal layer may be present and desirable to enhance visible transmission performance in the high-transmission interference filter segment, it is generally unnecessary (though possible if desired) to thicken more than one of such layers in the gradient band continuation, since two or more gradient metal layers tend to produce (a) more than one color across the gradient band and (b) nonuniform color due to slight variations in layer thicknesses. As metal layer thickness increases across the region defined by such gradient metal band component, solar and luminous reflection increases, luminous transmission decreases and solar rejection increases.

Usable metals in the optical element comprise silver, aluminum, chrome, nickel, brass, gold, stainless steel, copper, palladium and alloys or claddings of any of the foregoing. Silver is preferred. Each metal layer should be continuous to maximize visible light transmission and near infra-red solar rejection properties.

The metal layer(s) thickness in the high-transmission interference filter segment should be between 60 to 200, preferably 70 to 180 and most preferably 80 to 160 Å. For maximum reflection attenuation by the interference filter, when using plural (for example two) metal layers, reflection from each should be equal and this is best achieved by having the thickness and composition of each layer nearly identical.

Metal layer thickness of the gradient band continuation at the confluence with the interference filter segment is the same as the thickness of the layer of which it is an extension, which, as presented above, is 60 to 200, preferably 70 to 180 and most preferably 80 to 160 Å. This thickness gradually, though not necessarily linearly, increases to a maximum near the roof line of the vehicle which can very widely depending on desired performance, but is generally about 200 to 1,000, preferably about 300 to 600 Å. When a windshield extension (which can be the entire vehicle roof) is present and it is desired to extend the optical element into such area by including a high reflectance region, the metal layer thickness in such region is greater than that of the gradient band continuation at the confluence with the interference filter, but can otherwise vary widely. For convenience, the metal layer thickness in such high reflectance region is constant and substantially equal to the maximum thickness of the gradient band continuation which, as indicated, is generally about 200 to 1,000, preferably 300 to 600 Å.

The dielectric layer(s) of the optical element must be essentially transparent over the solar range (i.e. form 325 to 2125 nm) and at least one must exist between a pair of metal layers when plural layers are in the interference filter element. Exemplary usable dielectric materials include $SiO$, $SiO_2$, $Ta_2O_5$, $WO_3$ ... $SnO_2$, $Al_2O_3$, $MgF_2$, $ZnS$, and $ZnO_2$. $TiO_2$ is preferred for each dielectric layer.

As generally known, varying the thickness and composition of a dielectric layer spaced between two reflecting metal layers, will considerably vary the optical transmittance/reflection properties of the interference filter. More specifically, varying the thickness of the spacing dielectric layer varies the wave length associated with the reflection suppression (or transmission enhancement) band. Generally, the thickness of spacing dielectric layer(s) in the optical element should be between about 200 to about 1200 and preferably between 450 to 1000 Å to obtain the desired optical properties necessary for a commercially acceptable product. Metal oxide dielectric layers less than about 200 or more than about 1200 Å result in very low luminous transmittance.

Exterior dielectric layers contacting metal layer surfaces opposite to the metal surfaces contacting spacing dielectric layer(s) are preferably used in the interference filter element to enhance anti-reflection performance. Exterior dielectric layers generally should have a higher refractive index than glass i.e. greater than 1.5 and preferably greater than 1.8. The thickness of such exterior or outside dielectric layer(s) is generally less than the spacing dielectric layer(s) and should be about 100 to about 600 and preferably 160 to 500 Å.

Reflection-suppressing dielectric layers of substantially uniform thickness are preferably present in the gradient band continuation segment and optional high glare region of the optical element as extensions of and at substantially the same thickness of the reflection-suppressing layers of the interference filter. Their presence (i) provides a suitable surface to which the deposited metal layer will adhere; (ii) minimizes agglomeration of the metal layer deposited thereon; (iii) provides chemical and mechanical protection for the metal layer and (iv) maximizes visible transmission for a given solar rejection.

The solar screening components of the optical element rest in supporting face to face contact on the surface of a transparent substrate which itself can comprise one or plural layers. Such substrate can be selected from a variety of materials with choice generally governed by compatibility between the solar screening components and the substrate. Usable substrates should not be prone to stretch to avoid cracking the metal/dielectric layers and should be free of excess volatiles such as plasticizers, water vapor or absorbed gases. The dielectric layer of the solar screening components in direct contact with the substrate should adhere well to the substrate surface. Generally the solar screening portion of the optical element will adhere well to glass and certain flexible plastics such as polyesters, cast acrylics, polycarbonates, chlorinated plastics and epoxies. Polyurethanes and plasticized polyvinyl butyral as a substrate component in direct supportive contact with the solar screening film are too soft and extensible. Preferred substrates are sheets of transparent materials such as glass or non-extensible flexible plastics such as linear polyesters, e.g. molecularly oriented (i.e. biaxial or uniaxial) polyethylene terephthalate which is commercially available from Hoechst-Celanese Company as Hostaphan 4400-400. In a preferred construction the layers of the solar screening components are sequentially deposited on a flexible sheet substrate of biaxially oriented polyethylene terephthalate (PET), and then the substrate carrying the solar screening components is encapsulated within two layers of conventional plasticized polyvinyl butyral (PVB), one layer abutting the PET substrate and the other abutting the top layer of the solar screening component. The multi-layered encapsulate or sandwich containing PVB as the outer layers is then conventionally laminated between two rigid members such as glass panes to form a windshield W, or alternatively may be used a bilayer where lamination is to only one such rigid member. Each lamination should be conducted carefully to avoid adverse effect on the electrical conductivity of the optical element in the primary current path between bus bars and should not increase the haze level above 2%.

Individual layers of the solar screening components are deposited by known vacuum coating techniques such as vacuum evaporation or sputtering. Usable methods include evaporation (resistance or laser heated, or electron-beam vaporization) and sputtering (diode or magnetron) under normal or reactive conditions. Magnetron sputtering is preferred. A layer of graduated metal thickness may be deposited in any of several ways as follows:

(1) The speed of the substrate can be varied to change the duration of deposition on different regions of the substrate.

(2) The target area exposed to the substrate can be varied to provide the appropriate thickness profile such as by masking rectangular targets or using one or more shaped targets.

(3) A single target might be segmented to allow a different voltage to be applied to each segment. Those segments with higher applied voltages would have correspondingly higher deposition rates.

(4) The rate enhancing magnetic fields can be varied to achieve faster deposition in selected areas of the target.

The invention is further described in the following examples which are for illustration only and not intended to imply any limitation or restriction on the invention.

Samples described in Examples were prepared on 5 cm square or 5×15 cm 90 mm thick glass plate substrates. Prior to deposition of the solar screening components thereon, each glass plate was mechanically washed in detergent solution then rinsed and immersed in a 50/50 volume % solution of concentrated sulfuric acid and 30% hydrogen peroxide. After removal the plates were rinsed in distilled water and isopropanol, blown dry with nitrogen and placed in a vacuum chamber of the sputter coating apparatus.

All vapor deposited layers were sequentially applied one on top of the other by magnetron sputtering using a Leybold Heraeus Z400 sputter coater, the first layer being deposited on the glass plate surface. Tungsten oxide was reactively prepared using round metallic targets which had a diameter of about 7.5 cm and an area of about 44 square centimeters. Layer thicknesses were monitored using an Inficon XTC crystal monitor.

After the vacuum chamber was pumped to a base pressure of less than $1 \times 10^{-5}$ mbar, the appropriate gas mixture (see additional details below) was introduced for sputtering.

Typical conditions used to deposit the layers are in Table I. The tungsten layer in parentheses was deposited only where interior glare reduction was sought (Example 3). The first 60 Å of a top dielectric layer was deposited under especially mild conditions (lower wattage and lower oxygen partial pressure) to prevent damage to the underlying silver layer. Deposition times were varied to achieve the thicknesses specified. For a graduated metal layer thickness, the sputtering target was moved along the length of a 5×15 cm substrate at various rates as required to achieve the desired thickness profile.

TABLE I

| Layer | Air Flow (sccm) | O$_2$ Flow (sccm) | Pressure mBar | Power watts | Dep. Rate (Å/sec) |
|---|---|---|---|---|---|
| tungsten oxide | 30 | 6 | $3.5 \times 10^{-5}$ | 32 | 3 |
| silver | 30 | 0 | $2.5 \times 10^{-5}$ | 29 | 10 |
| (tungsten) | 30 | 0 | $2.5 \times 10^{-5}$ | 116 | 10 |
| tungsten oxide | 30 | 1 | $3.0 \times 10^{-5}$ | 19 | 1 |
| tungsten oxide | 30 | 6 | $3.5 \times 10^{-5}$ | 32 | 3 |

Optical properties were determined with a Perkin Elmer 330 UV/VIS/NIR spectrophotometer equipped with a 60 mm integrating sphere. When reflectance measurements were made the glass plate containing the layered solar screening structure was placed nearest the integrating sphere. Sheet resistivities were determined with an Alessi Model A&P series four point probe using a 1.5 volt power supply. Laminates were prepared with the outer vapor deposited layer in face to face contact with a PVB interlayer in the form of 30 mil thick Saflex ® sheet. The sequential layers of a laminate were: coated glass substrate /PVB/glass. In preparing a laminate the coated glass /PVB/glass assembly was preheated at 150° C. for 15 min and a pressure of 40 psi applied for 5 min. while maintaining such temperature. With the pressure maintained the laminate was then allowed to cool to room temperature.

Abbreviations used in the Examples are defined as follows:

Tv, Rv and Av=respectively, visible transmission, reflectance and absorption

Ts, Rs and As=respectively, solar transmission, reflectance and absorption

SR=solar energy rejection calculated under standard summer conditions specified in ASHRAE Handbook, 1985, chapter 27—i.e. % SR=100%—Ts—0.27×% As W03=tungsten oxide Res=sheet resistivity in ohms per square

EXAMPLE 1

An integral gradient band was introduced into a three layer interference filter as a continuation of the metal layer of the filter by gradually increasing the thickness of a silver layer in a tungsten oxide/silver/tungsten oxide multi-layer stack. The thickness of the silver layer was increased in the gradient metal band from about 110 Å to about 450 Å while both tungsten oxide layers on either side of the silver were held constant at about 400 Å. FIG. 4 schematically depicts the silver layer thickness profile versus potential position in a windshield while FIG. 2 shows region 27 as the actual windshield location of the gradient metal band.

After laminating 30 mil (0.76 mm) thick Saflex ® sheet to the upper tungsten oxide layer of the stack, the transmission (FIG. 5) and reflection (FIG. 6) spectra were taken at the high transmission interference filter segment and the zone of maximum thickness of the gradient band region (respectively labeled "IF" and "GB" in FIGS. 5 and 6) and the optical and electrical characteristics measured providing the following results:

TABLE 2

| Region | % Tv | % Rv | % As | % Rs | % SR | Res |
|---|---|---|---|---|---|---|
| interference filter | 72 | 17 | 20 | 33 | 48 | 5.12 |
| gradient metal band | 12 | 78 | 18 | 74 | 87 | 0.81 |

Figure 5:
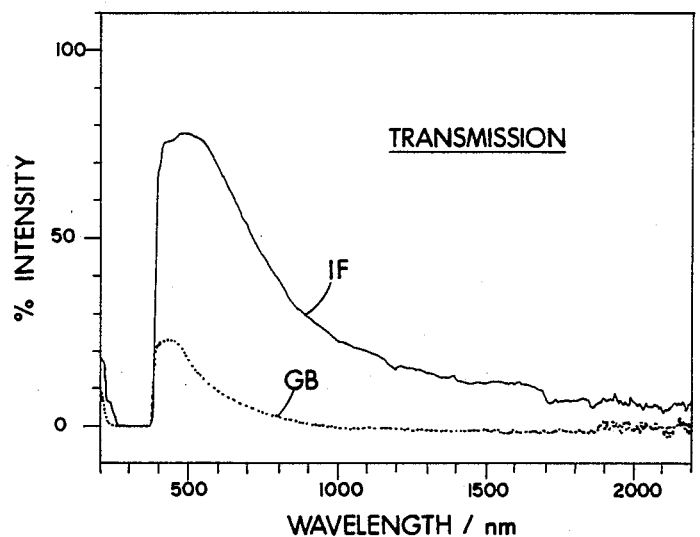
FIGS. 5, 6, 8, and 9 are normal incidence plots graphically illustrating measured transmission and reflection spectra in specific areas of laminates containing solar screening components of the optical element of the invention.
Figure 6:
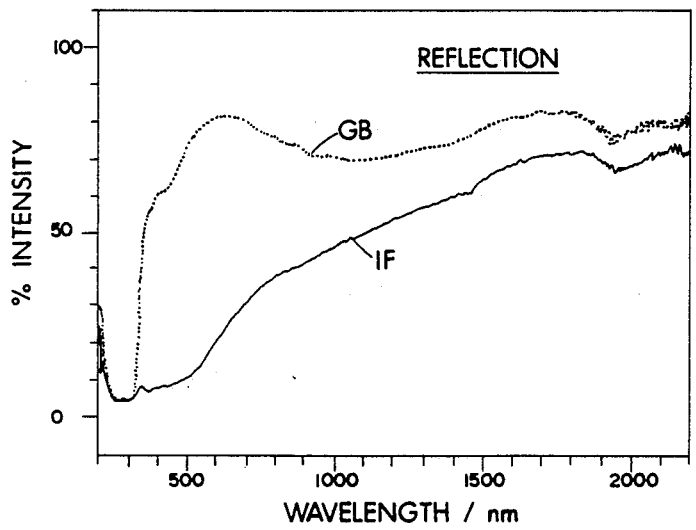

As apparent from FIG. 5 and Table 2, in the 400-700 nm range, visible light transmission of the interference filter segment through which a vehicle occupant would look when a full-size optical element of this construction is installed in a windshield, is desirably greater than 70% while solar reflection (FIG. 6) is 33%. On the other hand, reflective rejection in the gradient metal band region above an occupant's direct line of vision when such a film is positioned in a windshield is quite high as represented by the 74% Rs value in Table 2. Supporting the discussion above with respect to FIG. 10, since Res for the high transmission interference filter segment is much greater than that of the gradient metal band, most power will be developed across the interference filter segment where silver metal is thinnest and the luminous transmission is maximum.

COMPARATIVE EXAMPLE 1A

This compares optical performance of the gradient metal structure of Example 1 with a dyed gradient band conventionally present as an integral plastic section of a plasticized polyvinyl butyral interlayer. Such interlayer when installed in a laminated glass windshield would provide a dyed color band section (called "tinted" below) across the top of the windshield above the driver's direct field of vision and a clear, subjacent section (called "clear" below) opposite the direct field of vision through the windshield. Such a structure is typically shown in FIG. 1 of U.S. Pat. No. 3,038,206. The particular interlayer of this Comparative Example had a blue gradient band and is available from Monsanto Company as Saflex ® TG45. The measured optical properties of such interlayer are in Table 3 following. Though not shown, the measured transmission spectra for the clear and tinted portions of the interlayer exactly tracked and were equal to each other in the near IR 700-3000 nm range.

TABLE 3

| Region | % Tv | % Rv | % As | % Rs | % SR |
|---|---|---|---|---|---|
| Clear | 88 | 8 | 14 | 7 | 17 |

TABLE 3-continued

| Region | % Tv | % Rv | % As | % Rs | % SR |
|---|---|---|---|---|---|
| tinted | 12 | 5 | 46 | 6 | 40 |

Although the tinted section substantially reduces luminous transmission in the visible (400–700 nm) region, it provides no attenuation in the near IR region. Thus, though Tv is reduced to 12% in the tinted region, the overall solar rejection is only 40% in comparison with the 217% greater value of 87% SR in Example 1. The major solar rejection mechanism is absorptive in the tinted band as evidenced by 46% As which is not as effective as the major reflective rejection of 74% Rs achieved in Example 1.

EXAMPLE 2

To relate silver thickness to optical performance and explore functional gradient metal band thicknesses, samples were prepared as in Example 1 (i.e. three layer stacks of tungsten oxide/silver/tungsten oxide) each with the same thicknesses of tungsten oxide (450 Å next to the glass substrate and 500 Å for the external top layer) but with silver layer thicknesses which varied between samples (though silver layer thickness in each sample was uniform). Optical and electrical properties are in Table 4 which shows solar rejection increasing as silver metal layer thickness increases.

TABLE 4

| Sample | Silver Thkns. (Å) | Res | % Rs | % As | % Tv | % Rv | % SR |
|---|---|---|---|---|---|---|---|
| A57 | 120 | 4.48 | 23.3 | 21.0 | 78.6 | 10.1 | 38.6 |
| A56 | 140 | 3.73 | 28.7 | 22.0 | 75.2 | 13.5 | 44.8 |
| A63 | 160 | 3.05 | 31.3 | 24.7 | 69.4 | 15.7 | 49.3 |
| A58 | 200 | 2.20 | 40.0 | 22.4 | 62.8 | 23.5 | 56.4 |
| A62 | 300 | 1.36 | 54.8 | 22.7 | 40.8 | 43.5 | 71.4 |
| A59 | 400 | 0.97 | 67.4 | 19.6 | 24.4 | 63.8 | 81.7 |
| A64 | 500 | 0.74 | 73.1 | 20.7 | 11.4 | 74.7 | 88.2 |
| A60 | 600 | 0.58 | 77.5 | 18.7 | 7.2 | 82.6 | 91.2 |

From the above, about 100Å is the maximum thickness for about 70% Tv. 500A gave % Tv comparable to that typically found in the darkest portions of dyed gradient bands (12% in Table 3).

From the above, about 100 Å is the maximum thickness for about 70% Tv. 500 Å gave % Tv comparable to that typically found in the darkest portions of dyed gradient bands.(12% in Table 3).

EXAMPLE 3

Though a highly reflective metal gradient band is useful for solar rejection, depending on metal layer thickness, reflective glare into the eyes of occupant(s) within the vehicle passenger compartment can occur. This Example defines a structure for suppressing luminous reflection within a vehicle while maintaining the optical performance improvements achieved with a reflective metal gradient band described in Example 1.

Figure 8:
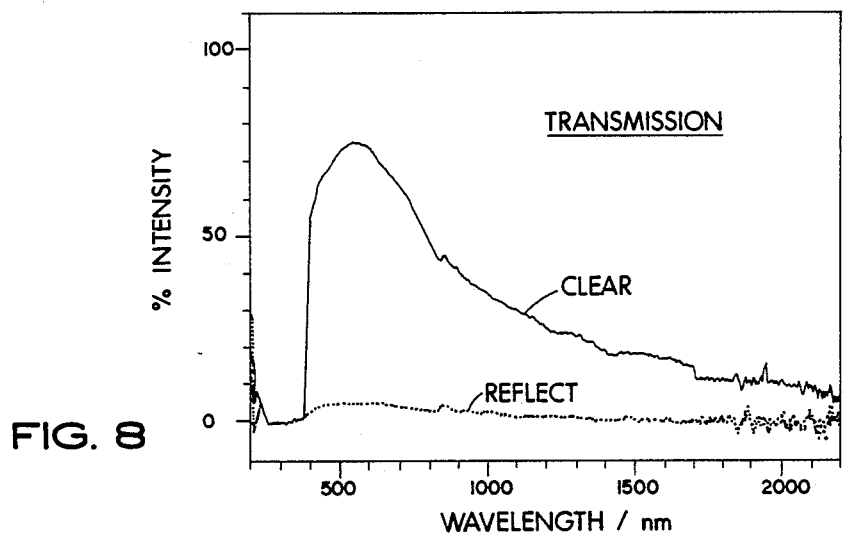
Figure 9:
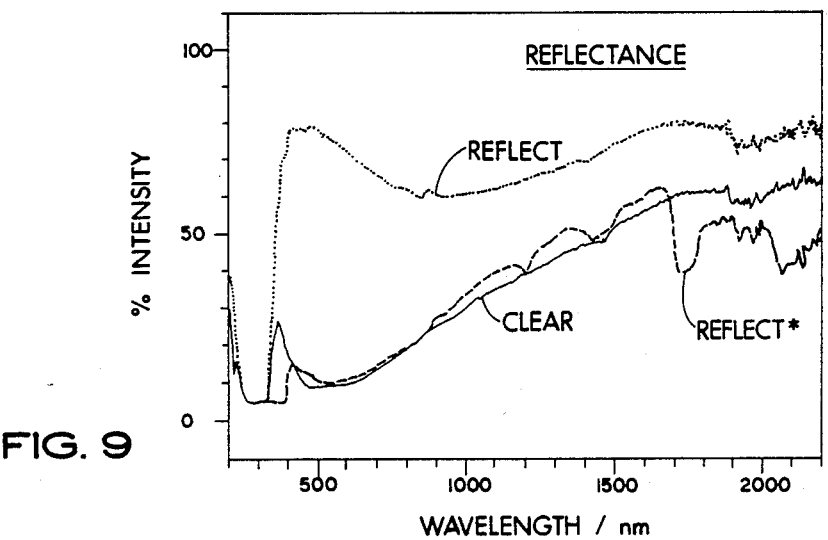

The approach is to introduce an additional metallic light-absorbing layer of graduated thickness between highly reflective gradient metal band regions and the interior of the vehicle. Tungsten metal deposited directly on a silver layer was used as the absorbing layer. Thus a prepared laminate had the following layer sequence: outboard 5×15 cm glass/tungsten oxide/graduated silver/graduated tungsten/tungsten oxide/polyvinyl butyral sheet/inboard 5×15 cm glass. The thicknesses of the internal and external tungsten oxide dielectric layers were held constant at approximately 450 Å and 500 Å respectively across the length of the sample. As shown in FIG. 7, silver layer thickness was varied between 450 Å (representative, for example, of that usable with a windshield extension) and 110 Å (representative, for example, of that used in the high transmission interference filter component) while tungsten layer thickness was varied between 0 Å at the start of the gradient silver metal band and 200 Å at the end of the maximum 450 Å thickness silver metal band. The optical properties measured at opposite ends of the sample (i.e. at 450 and 110 Å silver layer thickness) are in Table 5, with the corresponding transmission and reflection spectra shown in FIGS. 8 and 9 respectively, the spectra for the various regions identified with the same nomenclature as in FIG. 5. The optical measurements specified for the reflect* region were measured with the incident beam approaching so as to reach the tungsten layer before the silver layer whereas the reverse was the case for the "clear" and "reflect" regions.

TABLE 5

| Region | % Tv | % Rv | % As | % Rs | % SR | Res |
|---|---|---|---|---|---|---|
| clear | 73.4 | 9.7 | 26.7 | 21.8 | 41.3 | 5.49 |
| reflect | 5.0 | 74.0 | 28.2 | 68.4 | 89.0 | 0.79 |
| reflect* | 5.0 | 10.9 | 73.9 | 22.7 | 76.6 | 0.79 |

From these data it is evident that the tungsten layer is quite effective at suppressing luminous reflection (i.e. % Rv=10.9) when the coated glass is viewed from the tungsten rather than the silver side.

To demonstrate more precisely the effect of the anti-glare tungsten backing layer, several 5×5 cm samples of the following structure were prepared: outboard glass/tungsten oxide (450 Å) / silver (500 Å)/tungsten (various thicknesses: 0 Å, 20 Å, 50 Å, 200 Å) /tungsten oxide (500 Å)/30 mil Saflex sheet/inboard glass. The optical properties in Table 6 were measured with the incident beam approaching from both inboard and outboard sides of a laminate sample.

TABLE 6

| Sample | Tungsten thickness(Å) | % Tv | % Rv | % As | % Rs | % SR |
|---|---|---|---|---|---|---|
| A64 | 0Å | 11.4 | 74.7 | 20.7 | 73.1 | 88.2 |
| A64* | 0Å | 11.4 | 72.7 | 25.0 | 68.8 | 87.1 |
| A83 | 20Å | 10.5 | 76.6 | 20.3 | 73.9 | 91.6 |
| A83* | 20Å | 10.5 | 38.5 | 45.3 | 48.8 | 81.9 |
| A81 | 50Å | 8.7 | 76.3 | 21.7 | 73.2 | 89.0 |
| A81* | 50Å | 8.7 | 25.7 | 53.8 | 41.2 | 80.5 |
| A82 | 200Å | 2.6 | 84.2 | 21.0 | 77.3 | 92.6 |
| A82* | 200Å | 2.6 | 12.4 | 73.7 | 24.6 | 78.4 |

*measurement with incident beam approaching from inboard side.

The above results show that thickening the anti-glare tungsten layer increases suppression of luminous reflectivity but also decreases luminous transmission. From these results, when an anti-glare metal backing component is included in the optical element of the invention, thickness should range between 0 to 300 Å.

EXAMPLE 4

This shows the effect of grading the thickness of either one or more metal layers of a gradient band continuation containing plural metal layers.

Two families of samples were prepared.

Family #1 had the general structure: WO$_3$(350 Å)/Ag(100 Å)/WO$_3$(750 Å)/Ag(x)/WO$_3$(350 Å) where x varied from 100 to 600 Å. The data for family #1 samples are given in Table 7.

The structure for family #2 was: WO$_3$(350 Å)/Ag(x)/WO$_3$(750 Å)/Ag(x)/WO$_3$(350 Å) where x varied from 100 to 500 Å. The silver layers were of equal thickness in each sample of family #2. The data for family #2 samples are given in Table 8.

TABLE 7

| Smp # | x (A) | % Tv | % Rv | % Rs | % As | % SR | Res |
|---|---|---|---|---|---|---|---|
| H46 | 100 | 78 | 7 | 26 | 24 | 43 | 3.57 |
| H51 | 200 | 64 | 22 | 43 | 22 | 59 | 2.03 |
| H50 | 300 | 38 | 47 | 58 | 23 | 74 | 1.41 |
| H52 | 400 | 29 | 63 | 66 | 19 | 80 | 0.95 |
| H53 | 500 | 18 | 76 | 72 | 19 | 88 | 0.70 |
| H54 | 600 | 9 | 83 | 75 | 20 | 89 | 0.57 |

TABLE 8

| Smp # | x (A) | % Tv | % Rv | % Rs | % As | % SR | Res |
|---|---|---|---|---|---|---|---|
| H46 | 100 | 78 | 7 | 26 | 24 | 43 | 3.57 |
| H59 | 200 | 62 | 15 | 47 | 26 | 65 | 1.39 |
| H62 | 250 | 48 | 29 | 55 | 24 | 73 | 0.97 |
| H60 | 300 | 37 | 41 | 60 | 23 | 77 | 0.75 |
| H61 | 400 | 15 | 64 | 69 | 23 | 86 | 0.51 |
| H63 | 500 | 7 | 75 | 72 | 24 | 90 | 0.38 |

As evident from Tables 7 and 8, thickening one or both silver layers leads to several desirable effects including:

(1) increased solar rejection provided primarily by solar reflection (% Rs) which is considered the most effective rejection mechanism;

(2) decreased electrical resistance (Res) so less heating for defrosting occurs in the gradient band area than in the primary vision region, thus more optimally utilizing applied power;

(3) decreased visible transmission (% Tv) so that a driver or occupant is less subject to glare.

However, though thickening one or both silver layers provide the above advantages, the two approaches are not equivalent and thickening only one layer is preferred for the following reasons:

(1) By thickening only one silver layer (Table 7), reflected color across the gradient band became either gradually more gold or gradually more silver depending on which side the sample was viewed from. The visually perceived color (i.e. gold or silver) was reflectively uniform showing change as the silver layer was thickened. On the other hand when the thickness of both silver layers was varied (Table 8) the reflected color was first red and then (at greater silver thicknesses) became gold or silver colored. This variation in color observed across the gradient band for family #2 coatings is probably undesirable.

(2) Although all samples were made with the same sputter coater and consequently had the same degree of thickness nonuniformity, those with both silver layers thickened appeared much less uniformly colored in reflection and transmission. This strong sensitivity to unavoidable thickness nonuniformity exhibited by family #2 samples is because of the rapid change in reflection intensity (or transmission) over relatively narrow wavelength bands. The sensitivity of family #2 samples to film thickness would make these coatings more difficult to produce, particularly on large areas.

The foregoing Examples 1 and 2 illustrate advantages realized using a gradient silver layer rather than a dyed PVB layer. These advantages are as follows:

(1) Solar rejection for a given visible transmission with a metal gradient is higher than with a dyed gradient. For example both the dyed gradient and the metal gradient in Exs. 1 and 1(Tables 2 and 3) had luminous transmission (Tv) of about 12% in the darkest region of the gradient band; however, the metal gradient sample gave 87% SR versus 40% SR with the dyed gradient. Thus the metal gradient would result in a significantly reduced solar heat load permitting use of a smaller air conditioning unit in a vehicle.

(2) The metal gradient band should provide much better temperature control during soaking than a dyed gradient which will become increasingly important as front and rear windows in automobiles advance into the roof area. It is likely that a highly reflective section extending from the top of the high transmission interference filter segment of a windshield across the top of the vehicle to the clear portion of the rear window will result in lower soaking temperatures than will result with a solid painted roof. For example, solar reflectance of Krylon gloss white and gloss black paint was determined to equal 44% and 4%, respectively. The reflective region of a metal gradient has substantially higher solar reflectance than even white paint (e.g. 74% vs. 44%), suggesting that the metal gradient layer would be more effective at suppressing temperature rise in parked closed autos.

While certain specific embodiments of the invention have been described with particularity, various modifications will occur to those skilled in the art. The scope of the invention, therefore, is limited solely by the scope of the following claims.

I claim:

1. An optical element for a motor vehicle windshield comprising, in combination:
    (a) an interference filter which includes one or more light-reflecting metal layers and one or more reflection-suppressing layers for coacting with the one or more metal layers to minimize reflection and enhance transmission in the visible region;
    (b) a gradient band continuation of said interference filter above the direct line of vision through a windshield when disposed in a motor vehicle for reflective rejection of infra-red solar energy, said band including a light-reflecting metal layer gradually increasing in thickness toward a lateral edge of said band;
    (c) a transparent substrate supporting said filter and gradient band;
    (d) plural bus bars substantially parallel to said lateral edge in electrical contact with one or more metal layers of the interference filter and the metal layer of the gradient band continuation.

2. The optical element of claim 1 wherein the thickness of the metal layer of the gradient band continuation increases from about 60 to 200 Angstroms at the confluence with the interference filter to about 200 to 1,000 Angstroms.

3. The optical element of claim 1 wherein the gradient band continuation includes extensions of the one or more reflection-suppressing layers.

4. The optical element of claim 3 wherein the extension(s) of the one or more reflection-suppressing layers are substantially uniform in thickness.

5. The optical element of claim 4 wherein the thickness of the extension(s) of the one or more reflection-suppressing layers of the gradient band continuation are substantially the same as the thickness of the one or more reflection-suppressing layers of the interference filter.

6. The optical element of claim 5 wherein the interference filter includes two metal layers, each surface of which is in face-to-face engagement with a dielectric layer.

7. The optical element of any of claims 1, 2, 3, 4, 5, or 6 wherein the metal layer and the extension of the metal layer comprise silver.

8. The optical element of claim 7 wherein the extension of the metal layer includes a high reflectance region in electrical contact with one of the bus bars of substantially constant metal thickness which is greater than the minimum thickness of the metal layer extensions.

9. An optical element for a motor vehicle windshield comprising, in combination:
(a) an interference filter interposed in the direct line of vision through a windshield when said optical element is disposed therein in a motor vehicle, comprising two or more light-reflecting metal layers, each surface of which is contiguous with a dielectric layer;
(b) an integral gradient band extension increasing in thickness toward a lateral edge of said element;
(c) a transparent substrate supporting said filter and extension; and
(d) plural conducting members parallel to said lateral edge in electrically conductive contact with metal layers of the interference filter and gradient band extension;
whereby on supplying electrical power to said optical element, conductivity through the interference filter will be greater than through the gradient band extension.

10. The optical element of claim 9 wherein the interference filter contains two metal layers.

11. The optical element of claim 10 wherein the thickness of the metal layer extension increases from about 60 to 200 Angstroms at the confluence with the interference filter to about 200 to 1000 Angstroms.

12. The optical element of any of claims 9, 10 or 11 wherein the gradient band extension is above said direct line of vision through said windshield when the optical element is disposed therein in a motor vehicle.

* * * * *